United States Patent
Kono et al.

(10) Patent No.: US 6,765,084 B2
(45) Date of Patent: Jul. 20, 2004

(54) PRODUCTION PROCESS FOR ETHYLENE OXIDE RESIN

(75) Inventors: Michiyuki Kono, Neyagawa (JP); Manabu Kikuta, Kyotanabe (JP); Masahito Nishiura, Nishinomiya (JP); Fumihide Tamura, Kusatsu (JP); Shigetaka Takamiya, Himeji (JP); Taketo Toba, Takarazuka (JP)

(73) Assignees: Dai-ichi Kogyo Seiyakn Co., Ltd., Kyoto (JP); Nippon Shokubai Co., Ltd., Osaka (JP)

( * ) Notice: Subject to any disclaimer, the term of this patent is extended or adjusted under 35 U.S.C. 154(b) by 0 days.

(21) Appl. No.: 10/335,807

(22) Filed: Jan. 2, 2003

(65) Prior Publication Data

US 2003/0135022 A1 Jul. 17, 2003

(30) Foreign Application Priority Data

Jan. 15, 2002 (JP) ........................................ 2002-006724

(51) Int. Cl.$^7$ ............................. C08G 6/00; C08G 85/00
(52) U.S. Cl. ....................... 528/501; 528/491; 528/503; 526/64; 526/71
(58) Field of Search ................................ 528/491, 501, 528/503; 526/64, 71

(56) References Cited

U.S. PATENT DOCUMENTS

| 4,143,072 A | 3/1979 | Hetzel et al. |
| 4,306,943 A | 12/1981 | Mori et al. |

FOREIGN PATENT DOCUMENTS

| WO | WO 01/14456 A1 | 3/2001 |

*Primary Examiner*—Samuel A. Acquah
(74) *Attorney, Agent, or Firm*—Haugen Law Firm PLLP

(57) ABSTRACT

The present invention provides a novel production process for an ethylene oxide resin, in which, when the ethylene oxide resin is obtained, it is arranged that the resin should contain no antistatic agent, and further its water content is also easily controlled in not more than a definite amount, and the thermal damage of the above resin is prevented, and besides, the reduction of the cost can also be actualized. The production process for an ethylene oxide resin, according to the present invention, comprises the step of carrying out devolatilization of a solvent from a polymerization reaction liquid containing the solvent, thereby obtaining the ethylene oxide resin; with the production process being characterized by arranging that: after the devolatilization, the resin should have a solvent concentration of 0.01 to 30 weight % and a water content of not more than 200 ppm, and the resin should contain no antistatic agent.

7 Claims, No Drawings

PRODUCTION PROCESS FOR ETHYLENE OXIDE RESIN

BACKGROUND OF THE INVENTION

A. Technical Field

The present invention relates to a production process for an ethylene oxide resin. More particularly, the present invention relates to a production process for an ethylene oxide resin, which comprises the step of carrying out devolatilization of a reaction liquid of the aforementioned resin as obtained by a polymerization reaction.

B. Background Art

Ethylene oxide resins have hitherto been useful as polymer materials in uses such as: polyurethane resins (e.g. adhesives, paints, sealing agents, elastomers, and floor-polishing agents); and besides hard, soft, or half-hard polyurethane resins; and further surfactants, sanitary products, drinking agents, lubricating oils, and engine-starting liquids. In recent years, they are further being thought to utilize in other various new uses in consideration of their wide-ranging usability.

As to a production process for the above ethylene oxide resin, especially as to purification and recovery of the resin after a polymerization reaction, have hitherto been generally known methods such as: (1) a method that involves precipitating the resin by pouring the polymerization reaction solution into a poor solvent after the solution polymerization, and carrying out filtration or centrifugation treatment, and thereafter subjecting the resultant resin to drying and pulverization; and (2) a method that involves carrying out filtration or centrifugation treatment of the polymerization reaction liquid after the precipitation polymerization, and subjecting the resultant recovered resin to drying and pulverization.

However, these methods (1) and (2) are carried out through the step of heat-drying and pulverizing the resin because of reasons such as obtaining a resin having high purity. Therefore, there has been danger of explosion as caused by the electrification and heating of the resin, wherein the electrification is due to such as electrostatic charge as generated then. Accordingly, in consideration of its prevention and safety, it has been generally essential to add a sufficient quantity of antistatic agent.

The addition of this antistatic agent causes such as the rise of the permittivity of the resin as obtained unnecessarily, the cause of lowering crosslinking degree and increasing moisture absorbency, and then the increase of the swelling capacity of the resin unnecessarily, and the lowering of the strength. Accordingly, the ethylene oxide resin containing the antistatic agent has been very difficult to utilize for such as protecting films for color filters in view of the rise of the permittivity, and it has been very unsuitable to use for such as materials of flexographic printing and electrolyte layers of polymer battery in view of the lowering of the strength.

In addition, the ethylene oxide resin is a resin having an ether bond in its main chain, and has a property such that it (the portion of the ether bond) is weak against the strong heating (high temperature) in view of its molecular structure. Therefore, there has been a problem such that the resin is decomposed during the above-mentioned heat-drying. In addition, in the above methods (1) and (2), new additional elements such as the poor solvent are necessary in addition to the heat-drying, and such as the increase of the cost of equipment accompanying at least two steps also has to be considered, and therefore there has also been a problem of the increase of the cost.

Furthermore, the ethylene oxide resin is frequently used in the form of a solution or paste when it is used. In such a case, when the ethylene oxide resin is once produced in a powdery form as is shown in the above methods (1) and (2), it is very difficult to carry out treatment in such as a case of adding a new solvent thereto in order to produce it in the form of a solution or paste, and therefore there is also a problem in view of usability.

On the one hand, when the ethylene oxide resin is used for uses such as protecting films for color filters and polyelectrolytes of polymer battery, the water content of the resin is requested to lowly suppress in not more than a definite amount. However, in a state such that various conditions for obtaining a desirable resin are satisfied, and further that the water content is lowly controlled, it has not been easy to obtain the above resin by the hitherto general methods.

When this water content cannot be controlled in not more than a definite amount, the permittivity of the resin is unnecessarily raised, and there has been a problem such that: when it is used for such as protecting films for color filters, the protecting films are converted to conductors, and thereby the lowering of the function is caused. In addition, when it cannot be controlled similarly, this water reacts with such as metal ion components and then such as hydroxides are formed. Therefore, there has been a problem such that: when the above resin is used, for example, for such as electrolyte layers for polymer battery, insulating layers are formed in the interface between the metal and the electrolyte layer, and thereby the voltage continues to increase under a constant electric current, and the cyclic efficiency of the battery is also deteriorated.

SUMMARY OF THE INVENTION

A. Object of the Invention

Accordingly, an object of the present invention is to provide a novel production process for an ethylene oxide resin, in which, when the ethylene oxide resin is obtained, it is arranged that the resin should contain no antistatic agent, and further its water content is also easily controlled in not more than a definite amount, and the thermal damage of the above resin is prevented, and besides, the reduction of the cost can also be actualized.

B. Disclosure of the Invention

The present inventors have diligently studied in order to solve the above-mentioned problems.

In the course, they have taken note of a treatment method that involves purifying and recovering a resin by devolatilization, which has hitherto been known as one step in a general production process for a resin, and they have studied the effect as obtained by this treatment method. When the ethylene oxide resin is obtained, there has hitherto been not at all knowledge that: the above resin is synthesized by polymerization using a solvent, and thereafter the resin is purified and recovered through the devolatilization treatment. The above procedure has not been carried out as a matter of fact, either. Considering various effects as obtained by the devolatilization treatment, the present inventors have thought out that: in order to solve the above problems, the treatment step by the devolatilization should be included just when the ethylene oxide resin is obtained.

That is to say, they have presumed that: the purification and recovery by heat-drying is not carried out due to the devolatilization treatment, and therefore it is not necessary to add the antistatic agent either, and there is no problem of the increase of the cost as mentioned above either, and the water content of the resin can also easily be adjusted while the devolatilization treatment is carried out.

Accordingly, when the ethylene oxide resin is actually produced, subsequently to obtaining a polymerization reaction liquid by the polymerization using a solvent, the devolatilization treatment of the above reaction liquid is carried out in combination. Then, they have confirmed that the above problems can be solved at a stroke, and have completed the present invention.

That is to say, a production process for an ethylene oxide resin, according to the present invention, comprises the step of carrying out devolatilization of a solvent from a polymerization reaction liquid containing the solvent, thereby obtaining the ethylene oxide resin; with the production process being characterized by arranging that: after the devolatilization, the resin should have a solvent concentration of 0.01 to 30 weight % and a water content of not more than 200 ppm, and the resin should contain no antistatic agent.

In addition, in the above present invention production process for an ethylene oxide resin, the devolatilization can be carried out in the temperature range of 40 to 300° C. under the pressure range of 13 to 100,000 Pa, and the devolatilization can be carried out using at least one apparatus selected from the group consisting of stirring-tank evaporators, falling-film evaporators, thin-film evaporators, surface-renewal-type polymerization vessels, extruders, and kneaders.

These and other objects and the advantages of the present invention will be more fully apparent from the following detailed disclosure.

DETAILED DESCRIPTION OF THE INVENTION

Hereinafter, the present invention production process for an ethylene oxide resin (hereinafter, referred to as the present invention production process) is explained in detail. However, the scope of the present invention is not limited to these explanations. Anything other than the following illustrations can also be fitly changed and carried out in such a range as not to hinder the purpose of the present invention.

The present invention production process is a process comprising the step of carrying out devolatilization of a solvent from a polymerization reaction liquid containing the solvent, thereby obtaining the ethylene oxide resin, and it is arranged that: after the devolatilization, the resin should have a solvent concentration of 0.01 to 30 weight % and a water content of not more than 200 ppm, and the resin should contain no antistatic agent.

Hereinafter, the polymerization reaction liquid as subjected to the devolatilization treatment and the above devolatilization treatment for carrying out the present invention are explained in detail, and further the usage of the ethylene oxide resin as obtained in the present invention is also explained.

Polymerization Reaction Liquid

The polymerization reaction liquid containing the solvent in the present invention production process means a reaction solution containing an ethylene oxide resin (ethylene oxide copolymer) and a solvent after polymerization, as obtained after carrying out the polymerization by a polymerization method using a solvent, and means a resin solution that is an object of the devolatilization treatment (devolatilization treatment of a solvent component) as carried out subsequently to this polymerization.

There is no especial limitation on the content of the ethylene oxide resin component in the above polymerization reaction liquid, but the content is favorably in the range of 20 to 70 weight %, more favorably 25 to 65 weight %, still more favorably 30 to 60 weight %. In the case where the content of the above resin component is less than 20 weight %, there is a possibility that the productivity of the resin is extremely lowered. In the case where the content is more than 70 weight %, there is a possibility that the stirring is difficult to carry out because the viscosity of the polymerization reaction liquid is raised.

There is no especial limitation on the content of the solvent component in the above polymerization reaction liquid, but the content is favorably in the range of 30 to 80 weight %, more favorably 35 to 75 weight %, still more favorably 40 to 70 weight %. In the case where the content of the above solvent component is less than 30 weight %, there is a possibility that: the stirring is difficult to carry out because the viscosity of the polymerization reaction liquid is raised, and such as the liquid transfer or transportation to a devolatilization apparatus, and the devolatilization treatment itself are also difficult to carry out. In the case where the content is more than 80 weight %, there is a possibility that the productivity of the resin is extremely lowered.

The above polymerization reaction liquid may contain other components in addition to the ethylene oxide resin component and the solvent component. Examples thereof include reaction initiators (polymerization initiators), antioxidants, and solvating agents as generally used in the polymerization reaction.

Examples of the above reaction initiators favorably include: alkaline catalysts, such as sodium hydroxide, potassium hydroxide, potassium alcoholate, sodium alcoholate, potassium carbonate, and sodium carbonate; metals, such as potassium metal and sodium metal; Al—Mg composite oxide catalysts, such as calcined products of aluminum hydroxide magnesium (e.g. JP-A-268919/1996), magnesium oxides as obtained by adding metal ions (e.g. JP-B-015038/1994 and JP-A-227540/1995), calcined hydrotalcites (e.g. JP-A-718441/1990), or their surface-modified catalysts (e.g. JP-A-334782/1994); and barium oxides and barium hydroxides (e.g. JP-A-075187/1979), layer compounds (e.g. JP-A-505986/1994), strontium oxides and strontium hydroxides (e.g. JP-B-032055/1988), calcium compounds (e.g. JP-A-134336/1990), cesium compounds (e.g. JP-A-070308/1995), cyanated complexes of composite metals (e.g. JP-A-339361/1993), and acid catalysts, such as Lewis acids and Friedel-Crafts catalysts. These reaction initiators may be contained in the polymerization reaction liquid either alone respectively or in combinations with each other, and they are not especially limited thereto.

There is no especial limitation on the viscosity of the above polymerization reaction liquid, but the viscosity is favorably in the rage of 1,000 to 60,000 cps at 95° C., more favorably 10,000 to 45,000 cps at 95° C., still more favorably 15,000 to 35,000 cps at 95° C. In the case where the above viscosity is less than 1,000 cps at 95° C., there is a possibility that the lowering of the productivity of the resin is extremely caused. In the case where the viscosity is more than 60,000 cps at 95° C., there is a possibility that: the viscosity is extremely raised even during the polymerization, and such as the stirring is difficult to carry out.

There is no especial limitation on the above polymerization method using a solvent, but favorable examples thereof include a solution polymerization method and a precipitation polymerization method. Of the above, the solution polymerization method is more favorable because of its excellent productivity. The solution polymerization method that involves carrying out the polymerization while raw monomer components are fed into a solvent as charged beforehand is particularly favorable because of its safety such that the reaction heat is easily cooled. Incidentally, the solvent component in the polymerization reaction liquid usually means the solvent as used in the above polymerization method using a solvent. However, in such as a case where other solvents that are not used in the polymerization are added to the polymerization reaction liquid after this polymerization, it may be thought that the solvent component in the polymerization reaction liquid also contains other solvents above.

As the above solvent, favorable are organic solvents containing no active hydrogen such as a hydroxyl group. Examples thereof include: aromatic hydrocarbon solvents, such as benzene, toluene, xylene, and ethylbenzene; aliphatic hydrocarbon solvents, such as heptane, octane, n-hexane, n-pentane, and 2,2,4-trimethylpentane; alicyclic hydrocarbon solvents, such as cyclohexane and methylcyclohexane; ether solvents, such as diethyl ether, dibutyl ether, and methyl butyl ether; solvents of ethylene glycol dialkyl ethers such as dimethoxyethane; cyclic ethers, such as THF (tetrahydrofuran) and dioxane. Of the above, the toluene and xylene are particularly favorable. It is favorable that the above solvent is further the above organic solvent and does not contain water at all.

The ethylene oxide resin (ethylene oxide copolymer) as contained in the aforementioned polymerization reaction liquid is not especially limited if it includes a major proportion of a structural component derived from an ethylene oxide monomer in its molecular structure and is a resin that has an ether bond in its main chain. Specifically, the ethylene oxide resin is favorable a product as obtained by carrying out polymerization of a comonomer group including such as ethylene oxide and a substituted oxirane compound of a structural formula (1) below as raw monomers, wherein the structural formula (1) is:

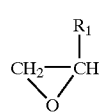

(1)

where: $R_1$ denotes Ra (Ra is any group having 1 to 16 carbon atoms selected from among alkyl groups, cycloalkyl groups, aryl groups, aralkyl groups, (meth)acryloyl groups, and alkenyl groups) or a —$CH_2$—O—Re—Ra group (Re has a structure of —($CH_2$—$CH_2$—O)$_p$— (p denotes an integer of 0 to 10))). This polymerization is favorably ring-opening polymerization of oxirane groups of the respective raw monomers.

The $R_1$ group in the above structural formula (1) is a substituent in the above substituted oxirane compound.

The substituted oxirane compound as used as the raw monomer may be only one of substituted oxirane compounds that can be represented by the structural formula (1), or may include at least two of such substituted oxirane compounds.

Specific examples of the substituted oxirane compound of the above structural formula (1) include propylene oxide, butylene oxide, 1,2-epoxypentane, 1,2-epoxyhexane, 1,2-epoxyoctane, cyclohexene oxide, and styrene oxide, or methyl glycidyl ether, ethyl glycidyl ether, and ethylene glycol methyl glycidyl ether. Furthermore, when the substituent $R_1$ is a crosslinkable substituent, namely, the substituent $R_1$ has such as an allyl group, an alkenyl group, an acryloyl group, or a methacryloyl group, examples thereof also include epoxybutene, 3,4-epoxy-1-pentene, 1,2-epoxy-5,9-cyclododecadiene, 3,4-epoxy-1-vinylcyclohexene, 1,2-epoxy-5-cyclooctene, glycidyl acrylate, glycidyl methacrylate, glycidyl sorbate, and glycidyl-4-hexanoate, or vinyl glycidyl ether, ally glycidyl ether, 4-vinylcyclohexyl glycidyl ether, α-terpenyl glycidyl ether, cyclohexenyl methylglycidyl ether, 4-vinylbenzyl glycidyl ether, and 4-allylbenzyl glycidyl ether. As is mentioned above, these may be used either alone respectively or in combinations with each other.

That the substituted oxirane compound having the above crosslinkable substituent (the substituent $R_1$ is a crosslinkable substituent) is essentially used as the above substituted oxirane compound is favorable in order that the ethylene oxide resin (ethylene oxide copolymer) is used as a crosslinked material.

There is no especial limitation on the weight-average molecular weight (Mw) of the aforementioned ethylene oxide resin, but it is favorably in the range of 20,000 to 300,000, more favorably 30,000 to 200,000, still more favorably 40,000 to 150,000. In the case where the above weight-average molecular weight is smaller than 20,000, there is a possibility that the tack is caused in a molded product. In the case where the molecular weight is larger than 300,000, there is a possibility that: the molding is difficult to carry out and the processability and the handling are lowered.

There is no especial limitation on the molecular weight distribution (Mw/Mn) of the aforementioned ethylene oxide resin, but it is favorably not more than 3, more favorably not more than 2. In the case where the above molecular weight distribution is more than 3, there is a possibility that: the tack is caused when the resin is molded to a molded product, and the handling is lowered.

Devolatilization

In the present invention production process, it is arranged that the ethylene oxide resin should be obtained by carrying out the devolatilization of the solvent component (volatizing the solvent component) from the polymerization reaction liquid containing the ethylene oxide resin and the solvent after the polymerization. However, the ethylene oxide resin as obtained is not limited to a resin containing no solvent component at all, but the resin is usually limited to a resin in which the solvent component has decreased and adjusted to a desirable solvent concentration by the devolatilization from a state of the above polymerization reaction liquid.

As to a devolatilization method and an apparatus and various conditions as used during the devolatilization, may be adopted such as an adoptable method during ordinary devolatilization, a usable apparatus, and various conditions as set. Their detailed explanations are shown below.

As to the devolatilization (evaporation) method, there are usually two steps that are a pre-devolatilization step and a main devolatilization step. As to the order of the devolatilization, the main devolatilization step is favorably carried out after the pre-devolatilization step, but there is no especial limitation thereto. The devolatilization may be carried out as one step in which the pre-devolatilization step is not distinguished from the main devolatilization step. The reason why the devolatilization step is favorably divided into two steps and then carried out is because the devolatilization efficiency (e.g. reducing the cost, shortening the treatment time, and quality of the resin) can be improved. The two steps are also theoretically favorable because of the following specific reasons: (1) the devolatilization treatment can be carried out slowly after a large amount of solvent in the polymerization reaction liquid before the devolatilization is rapidly decreased to such an solvent amount that the devolatilization treatment can be carried out efficiently; (2) the former step is carried out by the devolatilization under ordinary pressure, and the latter step is carried out by the devolatilization under vacuum (reduced pressure), and therefore the machine size can be reduced in comparison with the case of the one-step treatment; and (3) there is a case where the increase of the viscosity is suddenly caused in a certain concentration range during the devolatilization, and therefore the driving system can be reduced in comparison with the case of the one-step treatment. However, depending upon such as the kind of the polymerization reaction liquid to be subjected to the devolatilization treatment (especially, the kind of the resin in the polymerization reaction liquid), there is a case where even the above one-step treatment can be carried out in the same way as of the two-step treatment (the same effect can be obtained), and therefore the treatment may fitly be selected.

There is no especial limitation on apparatuses as used during the devolatilization (devolatilization apparatuses), but favorable examples thereof include stirring-tank evaporators, falling-film evaporators, thin-film evaporators, surface-renewal-type polymerization vessels, kneaders, roll mixers, intensive mixers (what is called, banbury mixers), and extruders. The devolatilization is favorably carried out using at least one apparatus selected from these apparatuses. In addition, the using conditions can fitly be set depending upon the apparatus as used.

The stirring-tank evaporator is excellent in that it can match with a wide range of viscosity and a wide range of solvent concentration. Examples thereof include stirring tanks equipping with helical impellers, stirring tanks equipping with double-helical-ribbon impellers, concentric coaxial mixing vessels (e.g. product name: SUPERBLEND, made by Sumitomo Heavy Industries. Ltd.) equipped with SUPER BLEND impellers (inner impeller: MAX BLEND impeller, and outer impeller: mavable helical baffle), and VERTICAL CONE REACTOR (made by Mitsubishi Heavy Industries, Ltd.). These can be used in both of the batchwise treatment and continuous treatment, but these are favorably used in the batchwise treatment. In addition, the apparatuses match with a process in which such as a small quantity of resins are precisely treated more favorably than with a process in which such as a large quantity of resins are treated, because it takes much time during discharging after the treatment in view of properties of the apparatuses. In addition, when these are used, the evaporation process is carried out by renewal of heat-transferred face.

Of the above various stirring-tank evaporators, the concentric coaxial mixing vessel can especially be given such as the following excellent characteristics (1) to (6): (1) the treatment viscosity range is wide, and the excellent blendability can be displayed in the viscosity range of 1 to 10,000 poise; (2) following the sudden change of viscosity in the tank, the blending functions of the inner and outer impellers naturally change and match therewith, and therefore the good fluid state can be preserved; (3) the high uniformity of the temperature can be preserved, and the deterioration of the resin quality can be lowered because the flow rate of the liquid (flow rate of the polymerization reaction liquid) at the wall face in the tank and in the center of the tank can be uniformly adjusted; (4) the slip and the residence of the low-viscosity liquid on the high-viscosity liquid disappear, and the dispersibility of such as reflux-condensing liquids and various additives after the polymerization can be improved; (5) the cohesion and accumulation at the tank wall and the baffle portion can disappear during the treatment of high-concentration slurry, and the good slurry dispersibility is displayed; and (6) the cohesion at the inner wall portion, and the time for washing the inside of the tank and its frequency can be lowered because of the stable flow rate at the wall face, which is caused by rotating the outer impeller that is close to the wall face of the tank.

Favorable examples of the falling-film evaporator include shell-and-tube-heat-exchanger-type evaporators (e.g. product name: Sulzer Mixer, made by Sumitomo Heavy Industries. Ltd.; and product name: Static Mixer, made by Noritake Co., Ltd.), and plate-heat-exchanger-type evaporators (e.g. product name: Hiviscous Evaporator, made by Mitsui Engineering & Shipbuilding Co., Ltd.). These can be used in both of the batchwise treatment and continuous treatment, and both of the treatments can favorably be carried out. In addition, in the devolatilization by these apparatuses, the heating is carried out by sensible heat in view of properties of the apparatuses. Thereafter, the sensible heat is converted to latent heat under reduced pressure, and then the evaporation is carried out. Therefore, the amount that can be devolatilized depends upon the sensible-heat amount as heated (heat amount transferable as the latent heat). Accordingly, favorable is a process in which the treatment amount matches with the sensible-heat amount as heated. However, the heat transfer can be promoted by stick mixers in the shell-and-tube-heat-exchanger-type evaporator, and therefore it can also match with a process with a wide range of the treatment amount. In addition, in the case of the shell-and-tube-heat-exchanger-type evaporator, the evaporation process is carried out by the expansion of interface area, and the highest treatment viscosity as matched is favorably 50,000 poise. In the case of the plate-heat-exchanger-type evaporator, the evaporation process is carried out by the expansion of heat-transferred area, and the highest treatment viscosity as matched is favorably 10,000 poise.

The thin-film evaporator is excellent in the respect that it can form uniform liquid film by acting centrifugal force with blades. Examples thereof include horizontal thin-film evaporators (e.g. product name: EVA reactor, made by Kansai Chemical Engineering Co., Ltd.), fixed-blade-type vertical thin-film evaporators (e.g. product named: EXEVA, made by Shinko Pantec Co., Ltd.), movable-blade-type vertical thin-film evaporators (e.g. product named: WIPRENE, made by Shinko Pantec Co., Ltd.), and tank-type (mirror-type) thin-film evaporators (e.g. product name: Recovery, made by Kansai Chemical Engineering Co., Ltd.). In the batchwise treatment with these evaporators, the horizontal and tank-type evaporators are not common but can be used, and the vertical evaporators cannot be used whether they are fixed-blade-type or movable-blade-type. In addition, in the continuous treatment, all the evaporators can be carried out. In view of properties of the apparatuses, as to all these apparatuses, the heating is carried out by sensible heat, and thereafter the sensible heat is converted to latent heat under reduced pressure, and then the evaporation is carried out. Therefore, the amount that can be devolatilized depends upon the sensible-heat amount as heated (heat amount transferable as the latent heat). Accordingly, favorable is a process in which the treatment amount matches with the sensible-heat amount as heated. In addition, as to all these apparatuses, the evaporation process is carried out by renewal of heat-transferred face.

In the horizontal thin-film evaporator, it is difficult to match with high viscosity on the discharging face in comparison with the vertical thin-film evaporator. Therefore, blades having excellent discharging effects are used, and the horizontal thin-film evaporator is made in order that it can match with the high viscosity, and the highest treatment viscosity as matched is favorably 500 poise. In the vertical thin-film evaporator, the high-viscosity liquid is more suitable than the low-viscosity liquid because of dropping down by its own weight, but the highest treatment viscosity as matched is favorably 1,000 poise in the movable-blade-type vertical thin-film evaporator. In addition, the fixed-blade-type vertical thin-film evaporator matches with the high viscosity by giving the fixed blade the effects of sweeping down, and the highest treatment viscosity as matched is favorably 10,000 poise. In the tank-type thin-film evaporator, the short path of the low-viscosity liquid can be suppressed by utilizing a mirror, and the highest treatment viscosity as matched is favorably 1,000 poise.

The surface-renewal-type polymerization vessel (horizontal thin-film polymerization vessel) is excellent in displaying high devolatilability by renewal of gas-liquid surface. Favorable examples thereof include single-screw surface-renewal-type polymerization vessels, and twin-screw surface-renewal-type polymerization vessels (e.g. product name: BIVOLAK, made by Sumitomo Heavy Industries. Ltd.; product name: Hitachi spectacle-shaped blade polymerization machine, made by Hitachi, Ltd.; Hitachi lattice-blade polymerization machine, made by Hitachi, Ltd.; and product name: SC processor, made by Kurimoto, Ltd.). These polymerization vessels cannot be used in the batchwise treatment, but all can be used in the continuous treatment. In view of properties of the apparatuses, as to all these apparatuses, the treatment amount of the devolatilization depends upon the transferring rate of substances in the apparatuses, and the evaporation process is carried out by renewal of gas-liquid surface.

The kneader, roll mixer, and intensive mixer (what is called, a banbury mixer) are suitable for blending such as high-viscosity molten products similarly to the extruder, and they are provided with devolatilability as an additional function. These can be used all in both of the batchwise treatment and continuous treatment. As to these apparatuses, the highest treatment viscosity as matched is favorably 10,000 poise.

The single-screw apparatus can ensure the surface area efficiently, and therefore displays high devolatilability, and the highest treatment viscosity as matched is favorably 10,000 poise. In addition, the twin-screw apparatus is excellent in self-cleaning ability due to little dead space and high piston flowability in the vessel, and in suppressing the residence of the liquid, and the highest treatment viscosity as matched is favorably 10,000 poise.

The extruder is suitable for blending such as high-viscosity melted products, and provided with devolatilability together with heating, melting, and kneading as additional functions. Favorable examples thereof include single-screw extruders, twin-screw extruders (e.g. product name: SUPERTEXαII, made by Japan Steel Works, Ltd.; and product name: BT-30-S2, made by Plastic Technology Laboratory), and a SCR self-cleaning-type reactor (made by Mitsubishi Heavy Industries, Ltd.). These cannot be used in the batchwise treatment, but all can be used in the continuous treatment. In view of properties of the apparatuses, as is mentioned above, these are suitable for a process in which the devolatilization treatment of a material having very high viscosity as an object is carried out, and the evaporation process is carried out by such as kneading and evaporation.

In the extruders, as to both of the single-screw extruders and twin-screw extruders, the highest treatment viscosity as matched is favorably 100,000 poise.

As is mentioned above, favorable examples of the devolatilization method include a method in which the main devolatilization step is favorably carried out after the pre-devolatilization step. Of the above various devolatilization apparatuses, there is no especial limitation on the apparatuses that can be used for the pre-devolatilization step, but examples thereof include the stirring tanks equipping with double-helical-ribbon impellers, concentric coaxial mixing vessels equipped with SUPER BLEND impellers, plate-heat-exchanger-type falling-film evaporators and fixed-blade-type vertical thin-film evaporators. In addition, there is no especial limitation on the apparatuses that can be used for the main devolatilization step, but examples thereof include the fixed-blade-type vertical thin-film evaporators, twin-screw surface-renewal-type polymerization vessels, kneaders, and twin-screw extruders.

When the devolatilization of the polymerization reaction liquid is carried out in the present invention production process, the devolatilization may be carried out by connecting the above enumerated various devolatilization apparatuses to what is called the apparatus for the preceding step, which is subjected to such as the above-mentioned polymerization step using a solvent, or may be carried out with the various devolatilization apparatuses after inserting the liquid transfer or transportation from this preceding apparatus. Examples of the latter case include: a form such that a liquid-transfer line is connected from the above apparatus for the preceding step to the devolatilization apparatus, and a form such that a midway tank (cushion tank) equipped with a jacket and a stirring machine is arranged between the above apparatus for the preceding step and the devolatilization apparatus.

The present invention production process is characterized in that: it is arranged by the devolatilization that the solvent concentration in the ethylene oxide resin after the devolatilization should be in the range of 0.01 to 30 weight %, favorably 0.05 to 20 weight %, more favorably 0.1 to 10 weight %. In the case where the above solvent concentration is less than 0.01 weight %, it is necessary to restrict the devolatilization condition excessively strictly, and therefore there is a possibility that: it leads to the thermal deterioration of the ethylene oxide resin, and the lowering of the performance is caused. In the case where the solvent concentration is more than 30 weight %, there is a possibility that: the tack is caused in the ethylene oxide resin after the devolatilization, and such as the blocking is caused.

In the present invention production process, the water content in the ethylene oxide resin after the devolatilization is favorably adjusted at the same time as the devolatilization of the solvent. The water is contained in such as the solvent and monomers that are used during the polymerization. The present invention production process is characterized in that the above water content is adjusted to not more than 200 ppm by the above adjustment. In the case where the above water content is more than 200 ppm, the permittivity of the resin is raised unnecessarily. Therefore, when the ethylene oxide resin as obtained is used, for example, for such as protecting films for color filters, there is a possibility that the fatal lowering of the function is caused as the above protecting films because the above resin is conductive. In addition, the water reacts with such as metal ion components and then such as hydroxides are formed. Therefore, when the ethylene oxide resin is used, for example, for such as electrolyte layers for polymer battery, there is a possibility that: insulating layers are formed in the interface between the metal and the electrolyte layer, and the voltage continues to increase under a constant electric current, and the cyclic efficiency of the battery is also deteriorated.

There is no especial limitation on means of adjusting the above water content, but examples thereof favorably include: to raise the devolatilization temperature and/or to increase the reduced-pressure degree of the devolatilization (incidentally, to increase the reduced-pressure degree means to lower the pressure, and to reduce the reduced-pressure degree means to raise the pressure). When the devolatilization temperature is raised to adjust the water content, there is no especial limitation on the temperature. However, if the temperature is too low, it is not efficient because the reduced-pressure degree has to be increased to excess. If the temperature is too high, there is a possibility that the thermal deterioration of the resin is caused. Therefore, it is arranged that the devolatilization temperature should fitly be set in consideration of these. In addition, when the reduced-pressure degree of the devolatilization is increased to adjust the water content, there is no especial limitation on the reduced-pressure degree. However, if the reduced-pressure degree is too large, it is thought difficult in consideration of sealability of the apparatus. If the reduced-pressure degree is too small, there is a possibility that: the water content cannot be controlled to not more than 200 ppm unless the devolatilization temperature is considerably raised. Therefore, it is arranged that the reduced-pressure degree should fitly be set in consideration of these.

The present invention production process enables the ethylene oxide resin to contain no antistatic agent after the devolatilization. As is mentioned above, the reason is because: the ethylene oxide resin is obtained not by the heat-drying but by the devolatilization after the polymerization in the present invention, and therefore it is not necessary to consider the electrification of the resin caused by such as friction between resins under the heat-drying. When the ethylene oxide resin as obtained contains the antistatic agent, the permittivity of the resin is raised unnecessarily, or the lowering of the crosslinking degree and the increase of the moisture absorbency are caused, and then the swelling capacity of the resin is increased unnecessarily, and the strength is lowered. Accordingly, when the ethylene oxide resin as obtained is used, for example, for such as protecting films for color filters, the fatal lowering of the function is caused as the above protecting film because the resin is conductive. In addition, when the above resin is used for such as materials of flexographic printing, the image reproducibility is also deteriorated because the desirable shape and the repulsion elasticity are difficult to maintain. Furthermore, when the above resin is used for such as separators, electrodes and electrolyte layers of polymer battery, the desirable shape cannot be maintained.

When the devolatilization of the solvent from the polymerization reaction liquid is carried out under heated conditions by using the above-mentioned devolatilization apparatus, the temperature is favorably in the range of 40 to 300° C., more favorably 60 to 250° C., still more favorably 90 to 200° C. The ethylene oxide resin having the above-mentioned desirable solvent concentration and water content can be obtained after the devolatilization by carrying out the devolatilization in this temperature range. In the case where the temperature is lower than 40° C., there is a possibility that the residual solvent is increased. In the case where the temperature is higher than 300° C., there is a possibility that the thermal decomposition of the polyether itself is caused. Herein, the above temperature means a temperature of the ethylene oxide resin in the devolatilization apparatus.

Similarly, when the devolatilization of the solvent is carried out by using the above devolatilization apparatus, the devolatilization is favorably carried out under a pressure of 13 to 100,000 Pa, more favorably 133 to 70,000 Pa, still more favorably 1,333 to 40,000 Pa. It is arranged that the pressure should satisfy this pressure range, and therefore the ethylene oxide resin having the solvent concentration and water content as mentioned above can be obtained after the devolatilization. In the case where the above pressure is lower than 13 Pa, there is a possibility that the solvent is flashed and the foaming is caused. In the case where the pressure is higher than 100,000 Pa, there is a possibility that the temperature has to be raised up to such an extent that the polyether is decomposed. Herein, the above pressure means a tank pressure in the devolatilization apparatus.

In the present invention production process, the viscosity of the ethylene oxide resin after the devolatilization is favorably in the range of 50 to 100,000 poise at 100° C., more favorably 100 to 80,000 poise at 100° C., still more favorably 220 to 60,000 poise at 100° C. In the case where the above viscosity is less than 50 poise at 100° C., there is a possibility that: the residual solvent is increased, and the tack and foaming are caused when being molded to a molded product. In the case where the above viscosity is more than 100,000 poise at 100° C., there is a possibility that: it is difficult to carry out the devolatilization in the devolatilization apparatus.

Usage of Ethylene Oxide Resin

The ethylene oxide resin as obtained by the present invention production process can favorably be used as a polymer material for wide-ranging uses. Specific examples thereof include: polyurethane resins (e.g. adhesives, paints, sealing agents, elastomers, and floor-polishing agents); and besides hard, soft, or half-hard polyurethane resins; and further, surfactants, sanitary products, drinking agents, lubricating oils, engine-starting liquids, separators, electrodes and polyelectrolyte layers of polymer battery, protecting films for color filters, and photosensitive resins usable for such as resists and materials of flexographic printing.

Effects and Advantages of the Invention

The present invention can provide a novel production process for an ethylene oxide resin, in which, when the ethylene oxide resin is obtained, it is arranged that the resin should contain no antistatic agent, and further its water content is also easily controlled in not more than a definite amount, and the thermal damage of the above resin is prevented, and besides, the reduction of the cost can also be actualized.

DETAILED DESCRIPTION OF THE PREFERRED EMBODIMENTS

Hereinafter, the present invention is more specifically illustrated by the following examples. However, the present invention is not limited to these examples in any way. Incidentally, hereinafter, the units "part(s) by weight", "hour (s)", and "liter(s)" simply denote "part(s)", "h", and "L" respectively for the sake of convenience.

Various measurement conditions in the below-mentioned examples and comparative examples are shown below.

Measurement of Residual Solvent Amount after Devolatilization

The residual solvent amount (wt %) in a test sample is measured with high-speed liquid chromatography (column: ODS-3 (produced by GL Science Co., Ltd., column temperature: 40° C., flow rate: 1.0 mL/min, injection amount: 5 µL, UV detector: 210 nm, eluent: mixed solution of "acetonitrile/0.1 wt % aqueous phosphoric acid solution" (volume ratio: acetonitrile/0.1 wt % aqueous phosphoric acid solution=85/15)). The resin after the devolatilization as an object of measurement is diluted with the above eluent so that the solid content will be 1.0 wt %, and the resultant solution is used as the test sample. As to the specific measurement method, a calibration curve is prepared by using calibration-curve samples for a predetermined solvent (e.g. toluene) first. Thereafter, the above test sample is measured, and the residual solvent amount is determined by using the calibration curve.

Measurement of Water Content in Resin After Devolatilization

The following (1) to (4) are put in a glove box and dried for not less than 2 hours: (1) a product as obtained by sampling and naturally cooling an ethylene oxide resin under a drying atmosphere while being heated (in a flowable state where the resin temperature close to the devolatilization temperature is retained) wherein the ethylene oxide resin is obtained after devolatilization; (2) toluene as a solvent (of which the water content is beforehand decreased to the utmost by molecular sieves (produced by Union Showa Co., Ltd., product name: Molecular Sieve 3A 1.6 or Molecular Sieve 4A 1.6)); (3) a glass container; and (4) syringes.

After the drying, 2 g of the ethylene oxide resin and 18 g of the toluene are added to the glass container, and the resultant mixture is dissolved with a magnetic stirrer to produce a resin solution. Thereafter, this resin solution is sampled all with the syringe. At the same time, 18 g of the toluene is only sampled with the other syringe.

The respective syringes after the sampling are taken out of the glove box, and the water contents of the resin solution and the toluene only are each measured by using AQUACOUNTERQ-7 (measurement apparatus for water content produced by HIRAMUMA Co., Ltd.).

From a value (ppm) of the water content as determined by this measurement, the weight (mg) of the water as contained in the resin solution and that of the water as contained in the toluene only are calculated respectively, and the weight (mg) of the water as contained in the ethylene oxide resin is determined from their difference. Then, the water content (ppm) of the ethylene oxide resin is calculated by dividing this difference (the weight (mg) of the water) by the weight (2 g) of the ethylene oxide resin as initially dissolved.

Measurement of Weight-Average Molecular Weight (Mw) and Molecular Weight Distribution (Mw/Mn) of Ethylene Oxide Resin They were measured with a GPC apparatus in which the calibration curve was prepared by using a standard molecular-weight sample of polyethylene oxide. The measurement was carried out after the polymerization reaction liquid (including polymers) as obtained after the reaction was dissolved in a predetermined solvent.

EXAMPLE 1

Thin-Film Evaporator

A polymerization reaction liquid (a), in which the weight percentage ratio between an ethylene oxide resin (a) and toluene (resin/toluene) was 50 weight %/50 weight %, was obtained by solution polymerization. Incidentally, the ethylene oxide resin (a) was a resin including a structural unit derived from ethylene oxide, a structural unit derived from butylene oxide, and a structural unit derived from methyl glycidyl ether in ratios of 180 parts by weight, 12 parts by weight, and 8 parts by weight in turn, and had a weight-average molecular weight Mw of 100,000.

The polymerization reaction liquid (a) was beforehand heated by steam of 50 to 100° C. as a heat medium, and then charged in a raw-material tank. Thereafter, the polymerization reaction liquid (a) was supplied from this raw-material tank to a thin-film evaporator (made by Shinko Pantec Co., Ltd., product named: EXEVA) at a supplying rate of 46 kg/h by using a gear pump, and the polymerization reaction liquid (a) was concentrated by the devolatilization. The thin-film evaporator was used while the rotation number of the stirring-blade motor, the rotation number of the discharging screw, the jacket temperature, and the pressure were set to 300 rpm, 90 to 100 rpm, 180° C., and 50 Torr (6,666 Pa) respectively. The resin temperature was 178° C. at the outlet of the thin-film evaporator.

As to the resin as obtained after the devolatilization, the weight percentage ratio between the ethylene oxide resin (a) and the toluene (resin/toluene) was 99.79 weight %/0.21 weight %, and the water content was 35 ppm.

EXAMPLE 2

Thin-Film Evaporator

A polymerization reaction liquid (b), in which the weight percentage ratio between an ethylene oxide resin (b) and toluene (resin/toluene) was 50 weight %/50 weight %, was obtained by solution polymerization. Incidentally, the ethylene oxide resin (b) was a resin including a structural unit derived from ethylene oxide, a structural unit derived from butylene oxide, and a structural unit derived from methyl glycidyl ether in ratios of 378 parts by weight, 25.2 parts by weight, and 16.8 parts by weight in turn, and had a weight-average molecular weight Mw of 90,000.

The polymerization reaction liquid (b) was beforehand heated by steam of 50 to 100° C. as a heat medium, and then charged in a raw-material tank. Thereafter, the polymerization reaction liquid (b) was supplied from this raw-material tank to a thin-film evaporator (made by Shinko Pantec Co., Ltd., product named: EXEVA) at a supplying rate of 30 kg/h by using a gear pump, and the polymerization reaction liquid (b) was concentrated by the devolatilization. The thin-film evaporator was used while the rotation number of the stirring-blade motor, the rotation number of the discharging screw, the jacket temperature, and the pressure were set to 300 rpm, 90 to 100 rpm, 180° C., and 50 Torr (6,666 Pa) respectively. The resin temperature was 173° C. at the outlet of the thin-film evaporator.

As to the resin as obtained after the devolatilization, the weight percentage ratio between the ethylene oxide resin (b) and the toluene (resin/toluene) was 99.83 weight %/0.17 weight %, and the water content was 28 ppm.

EXAMPLE 3

Twin-Screw Extruder

A polymerization reaction liquid (c), in which the weight percentage ratio between an ethylene oxide resin (c) and toluene (resin/toluene) was 50 weight %/50 weight %, was obtained by solution polymerization. Incidentally, the ethylene oxide resin (c) was a resin including a structural unit derived from ethylene oxide, a structural unit derived from butylene oxide, and a structural unit derived from methyl glycidyl ether in ratios of 378 parts by weight, 25.2 parts by weight, and 16.8 parts by weight in turn, and had a weight-average molecular weight Mw of 95,000.

The polymerization reaction liquid (c) was beforehand melted, and thereafter charged in a raw-material tank and heated at 80° C. At the same time, as to jackets of a 30φ twin-screw extruder (product name: BT-30-S2, made by Plastic Technology Laboratory), the jacket of a back bent was heated to 180° C., and the jackets of a supplying bent and the first to fifth bents were all heated to 150° C., and the two screws were rotated at 200 rpm. Thereafter, the polymerization reaction liquid (c) was supplied from the raw-material tank to the 30φ twin-screw extruder at a supplying rate of 14.4 kg/h by using a gear pump. At the same time as the supply, the pressures of the back bent, the first bent, and all the second to fourth bents were reduced to 100 Torr (13,332 Pa), 70 Torr (9,333 Pa), and not higher than 70 Torr (9,333 Pa) respectively (the pressures of the supplying bent and the fifth bent were not especially reduced), thus concentrating the polymerization reaction liquid (c) by the devolatilization. The resin temperature was 208° C. at the outlet of the 30φ twin-screw extruder.

As to the resin as obtained after the devolatilization, the weight percentage ratio between the ethylene oxide resin (c) and the toluene (resin/toluene) was 99.83 weight %/0.17 weight %, and the water content was 30 ppm.

EXAMPLE 4
Twin-Screw Extruder

A polymerization reaction liquid (d), in which the weight percentage ratio between an ethylene oxide resin (d) and toluene (resin/toluene) was 50 weight %/50 weight %, was obtained by solution polymerization. Incidentally, the ethylene oxide resin (d) was a resin including a structural unit derived from ethylene oxide, a structural unit derived from butylene oxide, and a structural unit derived from methyl glycidyl ether in ratios of 378 parts by weight, 25.2 parts by weight, and 16.8 parts by weight in turn, and had a weight-average molecular weight Mw of 84,000.

The polymerization reaction liquid (d) was beforehand melted, and thereafter charged in a raw-material tank and heated at 80° C. At the same time, as to jackets of a 30φ twin-screw extruder (product name: BT-30-S2, made by Plastic Technology Laboratory), the jackets of a back bent, a supplying bent, and the first and second bents were heated to 120° C., and the jacket of the third bent was heated to 80° C., and the jackets of the fourth and fifth bents were heated to 100° C., and the two screws were rotated at 80 rpm. Thereafter, the polymerization reaction liquid (d) was supplied from the raw-material tank to the 30φ twin-screw extruder at a supplying rate of 4.8 kg/h by using a gear pump. At the same time as the supply, the pressures of the back bent, the first bent, and all the second, third, and fifth bents were reduced to 110 Torr (14,665 Pa), 70 Torr (9,333 Pa), and not higher than 70 Torr (9,333 Pa) respectively (the pressures of the supplying bent and the fourth bent were not especially reduced), thus concentrating the polymerization reaction liquid (d) by the devolatilization. The resin temperature was 95° C. at the outlet of the 30φ twin-screw extruder.

As to the resin as obtained after the devolatilization, the weight percentage ratio between the ethylene oxide resin (d) and the toluene (resin/toluene) was 99.25 weight %/0.75 weight %, and the water content was 125 ppm.

EXAMPLE 5
Stirring-Tank Evaporator

A polymerization reaction liquid (d), in which the weight percentage ratio between an ethylene oxide resin (d) and toluene (resin/toluene) was 50 weight %/50 weight %, was obtained by solution polymerization in the same way as of Example 4.

To a concentric coaxial mixing vessel (product name: SUPERBLEND, made by Sumitomo Heavy Industries. Ltd.) equipped with SUPER BLEND impellers (inner impeller: MAX BLEND impeller, and outer impeller: mavable helical baffle), 45 kg of the polymerization reaction liquid (d) was added, and the stirring was carried out by forwardly rotating the MAX BLEND impeller and the mavable helical baffle at 16 rpm and 17 rpm respectively in a state such that the jacket temperature was heated to 160° C. Then, the devolatilization of the toluene was carried out for 3 hours under atmospheric pressure, and thereafter the devolatilization of the toluene was further carried out for 1.5 hours under reduced pressure of 410 Torr (54,662 Pa) at the maximum, thus concentrating the polymerization reaction liquid (d).

As to the resin as obtained after the devolatilization, the weight percentage ratio between the ethylene oxide resin (d) and the toluene (resin/toluene) was 92.4 weight %/7.6 weight %, and the water content was 200 ppm.

EXAMPLE 6
Stirring-Tank Evaporator

A polymerization reaction liquid (e), in which the weight percentage ratio between an ethylene oxide resin (e) and toluene (resin/toluene) was 50 weight %/50 weight %, was obtained by solution polymerization. Incidentally, the ethylene oxide resin (e) was a resin including a structural unit derived from ethylene oxide, a structural unit derived from butylene oxide, and a structural unit derived from methyl glycidyl ether in ratios of 378 parts by weight, 25.2 parts by weight, and 16.8 parts by weight in turn, and had a weight-average molecular weight Mw of 103,000.

To a concentric coaxial mixing vessel (product name: SUPERBLEND, made by Sumitomo Heavy Industries. Ltd.) equipped with SUPER BLEND impellers (inner impeller: MAX BLEND impeller, and outer impeller: mavable helical baffle), 45 kg of the polymerization reaction liquid (e) was added, and the stirring was carried out by forwardly rotating the MAX BLEND impeller and the mavable helical baffle at 75 rpm and 30 rpm respectively in a state such that the jacket temperature was heated to 160° C. Then, the devolatilization of the toluene was carried out for 3.5 hours under atmospheric pressure, and thereafter the devolatilization of the toluene was further carried out for 1.5 hours under reduced pressure of 50 Torr (6,666 Pa) at the maximum, thus concentrating the polymerization reaction liquid (e).

As to the resin as obtained after the devolatilization, the weight percentage ratio between the ethylene oxide resin (e) and the toluene (resin/toluene) was 99.60 weight %/0.40 weight %, and the water content was 89 ppm.

EXAMPLE 7
Thin-Film Evaporator

A polymerization reaction liquid (f), in which the weight percentage ratio between an ethylene oxide resin (f) and toluene (resin/toluene) was 50 weight %/50 weight %, was obtained by solution polymerization. Incidentally, the ethylene oxide resin (f) was a resin including a structural unit derived from ethylene oxide, a structural unit derived from butylene oxide, and a structural unit derived from allyl glycidyl ether in ratios of 378 parts by weight, 25.2 parts by weight, and 16.8 parts by weight in turn, and had a weight-average molecular weight Mw of 97,000.

The polymerization reaction liquid (f) was beforehand heated by steam of 50 to 100° C. as a heat medium, and then charged in a raw-material tank. Thereafter, the polymerization reaction liquid (f) was supplied from this raw-material tank to a thin-film evaporator (made by Shinko Pantec Co., Ltd., product named: EXEVA) at a supplying rate of 33 L/h by using a gear pump, and the polymerization reaction liquid (f) was concentrated by the devolatilization. The thin-film evaporator was used while the rotation number of the stirring-blade motor, the rotation number of the discharging screw, the jacket temperature, and the pressure were set to 300 rpm, 90 to 100 rpm, 180° C., and 50 Torr (6,666 Pa) respectively. The resin temperature was 175° C. at the outlet of the thin-film evaporator.

As to the resin as obtained after the devolatilization, the weight percentage ratio between the ethylene oxide resin (f)

and the toluene (resin/toluene) was 99.84 weight %/0.16 weight %, and the water content was 27 ppm.

EXAMPLE 8

Thin-Film Evaporator

A polymerization reaction liquid (g), in which the weight percentage ratio between an ethylene oxide resin (g) and toluene (resin/toluene) was 50 weight %/50 weight %, was obtained by solution polymerization. Incidentally, the ethylene oxide resin (g) was a resin including a structural unit derived from ethylene oxide, a structural unit derived from butylene oxide, and a structural unit derived from allyl glycidyl ether in ratios of 378 parts by weight, 25.2 parts by weight, and 4 parts by weight in turn, and had a weight-average molecular weight Mw of 97,000.

The polymerization reaction liquid (g) was beforehand heated by steam of 50 to 100° C. as a heat medium, and then charged in a raw-material tank. Thereafter, the polymerization reaction liquid (g) was supplied from this raw-material tank to a thin-film evaporator (made by Shinko Pantec Co., Ltd., product named: EXEVA) at a supplying rate of 33 L/h by using a gear pump, and the polymerization reaction liquid (g) was concentrated by the devolatilization. The thin-film evaporator was used while the rotation number of the stirring-blade motor, the rotation number of the discharging screw, the jacket temperature, and the pressure were set to 300 rpm, 90 to 100 rpm, 180° C., and 50 Torr (6,666 Pa) respectively. The resin temperature was 175° C. at the outlet of the thin-film evaporator.

As to the resin as obtained after the devolatilization, the weight percentage ratio between the ethylene oxide resin (g) and the toluene (resin/toluene) was 99.83 weight %/0.17 weight %, and the water content was 29 ppm.

EXAMPLE 9

Thin-Film Evaporator

A polymerization reaction liquid (h), in which the weight percentage ratio between an ethylene oxide resin (h) and toluene (resin/toluene) was 50 weight %/50 weight %, was obtained by solution polymerization. Incidentally, the ethylene oxide resin (h) was a resin including a structural unit derived from ethylene oxide, a structural unit derived from butylene oxide, and a structural unit derived from allyl glycidyl ether in ratios of 378 parts by weight, 15 parts by weight, and 16 parts by weight in turn, and had a weight-average molecular weight Mw of 110,000.

The polymerization reaction liquid (h) was beforehand heated by steam of 50 to 100° C. as a heat medium, and then charged in a raw-material tank. Thereafter, the polymerization reaction liquid (h) was supplied from this raw-material tank to a thin-film evaporator (made by Shinko Pantec Co., Ltd., product named: EXEVA) at a supplying rate of 60 kg/h by using a gear pump, and the polymerization reaction liquid (h) was concentrated by the devolatilization. The thin-film evaporator was used while the rotation number of the stirring-blade motor, the rotation number of the discharging screw, the jacket temperature, and the pressure were set to 600 rpm, 90 to 100 rpm, 150° C., and 500 Torr (66,661 Pa) respectively. The resin temperature was 138° C. at the outlet of the thin-film evaporator.

As to the resin as obtained after the devolatilization, the weight percentage ratio between the ethylene oxide resin (h) and the toluene (resin/toluene) was 90.10 weight %/9.90 weight %, and the water content was 190 ppm.

EXAMPLE 10

Thin-Film Evaporator

A polymerization reaction liquid (i), in which the weight percentage ratio between an ethylene oxide resin (i) and toluene (resin/toluene) was 50 weight %/50 weight %, was obtained by solution polymerization. Incidentally, the ethylene oxide resin (i) was a resin including a structural unit derived from ethylene oxide, a structural unit derived from butylene oxide, and a structural unit derived from allyl glycidyl ether in ratios of 378 parts by weight, 40 parts by weight, and 16 parts by weight in turn, and had a weight-average molecular weight Mw of 110,000.

The polymerization reaction liquid (i) was beforehand heated by steam of 50 to 100° C. as a heat medium, and then charged in a raw-material tank. Thereafter, the polymerization reaction liquid (i) was supplied from this raw-material tank to a thin-film evaporator (made by Shinko Pantec Co., Ltd., product named: EXEVA) at a supplying rate of 60 kg/h by using a gear pump, and the polymerization reaction liquid (i) was concentrated by the devolatilization. The thin-film evaporator was used while the rotation number of the stirring-blade motor, the rotation number of the discharging screw, the jacket temperature, and the pressure were set to 600 rpm, 90 to 100 rpm, 150° C., and 500 Torr (66,661 Pa) respectively. The resin temperature was 138° C. at the outlet of the thin-film evaporator.

As to the resin as obtained after the devolatilization, the weight percentage ratio between the ethylene oxide resin (i) and the toluene (resin/toluene) was 90.10 weight %/9.90 weight %, and the water content was 180 ppm.

EXAMPLE 11

Thin-Film Evaporator

A polymerization reaction liquid (j), in which the weight percentage ratio between an ethylene oxide resin (j) and toluene (resin/toluene) was 50 weight %/50 weight %, was obtained by solution polymerization. Incidentally, the ethylene oxide resin (j) was a resin including a structural unit derived from ethylene oxide, a structural unit derived from butylene oxide, and a structural unit derived from epoxy-butene in ratios of 378 parts by weight, 25.2 parts by weight, and 16.8 parts by weight in turn, and had a weight-average molecular weight Mw of 26,000.

The polymerization reaction liquid (i) was beforehand heated by steam of 50 to 100° C. as a heat medium, and then charged in a raw-material tank. Thereafter, the polymerization reaction liquid (j) was supplied from this raw-material tank to a thin-film evaporator (made by Shinko Pantec Co., Ltd., product named: EXEVA) at a supplying rate of 30 kg/h by using a gear pump, and the polymerization reaction liquid (j) was concentrated by the devolatilization. The thin-film evaporator was used while the rotation number of the stirring-blade motor, the rotation number of the discharging screw, the jacket temperature, and the pressure were set to 300 rpm, 90 to 100 rpm, 180° C., and 50 Torr (6,666 Pa) respectively. The resin temperature was 173° C. at the outlet of the thin-film evaporator.

As to the resin as obtained after the devolatilization, the weight percentage ratio between the ethylene oxide resin (j) and the toluene (resin/toluene) was 99.83 weight %/0.17 weight %, and the water content was 25 ppm.

EXAMPLE 12

Thin-Film Evaporator

A polymerization reaction liquid (k), in which the weight percentage ratio between an ethylene oxide resin (k) and toluene (resin/toluene) was 50 weight %/50 weight %, was obtained by solution polymerization. Incidentally, the ethylene oxide resin (k) was a resin including a structural unit derived from ethylene oxide and a structural unit derived from butylene oxide in ratios of 257 parts by weight and 16.8 parts by weight in turn, and had a weight-average molecular weight Mw of 80,000.

The polymerization reaction liquid (k) was beforehand heated by steam of 50 to 100° C. as a heat medium, and then charged in a raw-material tank. Thereafter, the polymerization reaction liquid (k) was supplied from this raw-material tank to a thin-film evaporator (made by Shinko Pantec Co., Ltd., product named: EXEVA) at a supplying rate of 30 kg/h by using a gear pump, and the polymerization reaction liquid (k) was concentrated by the devolatilization. The thin-film evaporator was used while the rotation number of the stirring-blade motor, the rotation number of the discharging screw, the jacket temperature, and the pressure were set to 300 rpm, 90 to 100 rpm, 180° C., and 50 Torr (6,666 Pa) respectively. The resin temperature was 173° C. at the outlet of the thin-film evaporator.

As to the resin as obtained after the devolatilization, the weight percentage ratio between the ethylene oxide resin (k) and the toluene (resin/toluene) was 99.83 weight %/0.17 weight %, and the water content was 26 ppm.

EXAMPLE 13
Thin-Film Evaporator

A polymerization reaction liquid (l), in which the weight percentage ratio between an ethylene oxide resin (l) and toluene (resin/toluene) was 50 weight %/50 weight %, was obtained by solution polymerization. Incidentally, the ethylene oxide resin (l) was a resin including a structural unit derived from ethylene oxide and a structural unit derived from butylene oxide in ratios of 378 parts by weight and 26 parts by weight in turn, and had a weight-average molecular weight Mw of 110,000.

The polymerization reaction liquid (l) was beforehand heated by steam of 50 to 100° C. as a heat medium, and then charged in a raw-material tank. Thereafter, the polymerization reaction liquid (l) was supplied from this raw-material tank to a thin-film evaporator (made by Shinko Pantec Co., Ltd., product named: EXEVA) at a supplying rate of 44 L/h by using a gear pump, and the polymerization reaction liquid (l) was concentrated by the devolatilization. The thin-film evaporator was used while the rotation number of the stirring-blade motor, the rotation number of the discharging screw, the jacket temperature, and the pressure were set to 300 rpm, 90 to 100 rpm, 180° C., and 50 Torr (6,666 Pa) respectively. The resin temperature was 69° C. during the supply to the thin-film evaporator, and the resin temperature was 175° C. at the outlet of the thin-film evaporator.

As to the resin as obtained after the devolatilization, the weight percentage ratio between the ethylene oxide resin (l) and the toluene (resin/toluene) was 99.53 weight %/0.47 weight %, and the water content was 78 ppm.

EXAMPLE 14
Thin-Film Evaporator

A polymerization reaction liquid (m), in which the weight percentage ratio between an ethylene oxide resin (m) and toluene (resin/toluene) was 50 weight %/50 weight %, was obtained by solution polymerization. Incidentally, the ethylene oxide resin (m) was a resin including a structural unit derived from ethylene oxide and a structural unit derived from butylene oxide in ratios of 200 parts by weight and 25 parts by weight in turn, and had a weight-average molecular weight Mw of 105,000.

The polymerization reaction liquid (m) was beforehand heated by steam of 50 to 100° C. as a heat medium, and then charged in a raw-material tank. Thereafter, the polymerization reaction liquid (m) was supplied from this raw-material tank to a thin-film evaporator (made by Shinko Pantec Co., Ltd., product named: EXEVA) at a supplying rate of 39 L/h by using a gear pump, and the polymerization reaction liquid (m) was concentrated by the devolatilization. The thin-film evaporator was used while the rotation number of the stirring-blade motor, the rotation number of the discharging screw, the jacket temperature, and the pressure were set to 300 rpm, 90 to 100 rpm, 180° C., and 50 Torr (6,666 Pa) respectively. The resin temperature was 176° C. at the outlet of the thin-film evaporator.

As to the resin as obtained after the devolatilization, the weight percentage ratio between the ethylene oxide resin (m) and the toluene (resin/toluene) was 99.74 weight %/0.26 weight %, and the water content was 43 ppm.

EXAMPLE 15
Thin-Film Evaporator

A polymerization reaction liquid (n), in which the weight percentage ratio between an ethylene oxide resin (n) and toluene (resin/toluene) was 33 weight %/67 weight %, was obtained by solution polymerization. Incidentally, the ethylene oxide resin (n) was a resin including a structural unit derived from ethylene oxide and a structural unit derived from butylene oxide in ratios of 378 parts by weight and 29 parts by weight in turn, and had a weight-average molecular weight Mw of 175,000.

The polymerization reaction liquid (n) was beforehand heated by steam of 50 to 100° C. as a heat medium, and then charged in a raw-material tank. Thereafter, the polymerization reaction liquid (n) was supplied from this raw-material tank to a thin-film evaporator (made by Shinko Pantec Co., Ltd., product named: EXEVA) at a supplying rate of 11.4 L/h by using a gear pump, and the polymerization reaction liquid (n) was concentrated by the devolatilization. The thin-film evaporator was used while the rotation number of the stirring-blade motor, the rotation number of the discharging screw, the jacket temperature, and the pressure were set to 300 rpm, 90 to 100 rpm, 180° C., and 50 Torr (6,666 Pa) respectively. The resin temperature was 74° C. during the supply to the thin-film evaporator, and the resin temperature was 180° C. at the outlet of the thin-film evaporator.

As to the resin as obtained after the devolatilization, the weight percentage ratio between the ethylene oxide resin (n) and the toluene (resin/toluene) was 99.70 weight %/0.30 weight %, and the water content was 50 ppm.

EXAMPLE 16
Thin-Film Evaporator

A polymerization reaction liquid (o), in which the weight percentage ratio between an ethylene oxide resin (o) and toluene (resin/toluene) was 33 weight %/67 weight %, was obtained by solution polymerization. Incidentally, the ethylene oxide resin (o) was a resin including a structural unit derived from ethylene oxide and a structural unit derived from butylene oxide in ratios of 200 parts by weight and 26 parts by weight in turn, and had a weight-average molecular weight Mw of 180,000.

The polymerization reaction liquid (o) was beforehand heated by steam of 50 to 100° C. as a heat medium, and then charged in a raw-material tank. Thereafter, the polymerization reaction liquid (o) was supplied from this raw-material tank to a thin-film evaporator (made by Shinko Pantec Co., Ltd., product named: EXEVA) at a supplying rate of 22.1 L/h by using a gear pump, and the polymerization reaction liquid (o) was concentrated by the devolatilization. The thin-film evaporator was used while the rotation number of the stirring-blade motor, the rotation number of the discharging screw, the jacket temperature, and the pressure were set to 300 rpm, 90 to 100 rpm, 180° C., and 50 Torr (6,666 Pa) respectively. The resin temperature was 74° C. during the supply to the thin-film evaporator, and the resin temperature was 182° C. at the outlet of the thin-film evaporator.

As to the resin as obtained after the devolatilization, the weight percentage ratio between the ethylene oxide resin (o) and the toluene (resin/toluene) was 99.39 weight %/0.61 weight %, and the water content was 102 ppm.

EXAMPLE 17

Twin-Screw Extruder

A polymerization reaction liquid (o), in which the weight percentage ratio between an ethylene oxide resin (o) and toluene (resin/toluene) was 33 weight %/67 weight %, was obtained by solution polymerization in the same way as of Example 16.

The polymerization reaction liquid (o) was beforehand melted, and thereafter charged in a raw-material tank and heated at 80° C. At the same time, as to jackets of a 30ϕ twin-screw extruder (product name: BT-30-S2, made by Plastic Technology Laboratory), the jackets of a back bent, a supplying bent, and the first to fourth bents were all heated to 180° C., and the jacket of the fifth bent was heated to 100° C., and the two screws were rotated at 100 rpm. Thereafter, the polymerization reaction liquid (o) was supplied from the raw-material tank to the 30ϕ twin-screw extruder at a supplying rate of 8.5 kg/h by using a gear pump. At the same time as the supply, the pressures of the back bent, the first bent, and all the second to fourth bents were reduced to 150 Torr (19,998 Pa), 80 Torr (10,666 Pa), and not higher than 80 Torr (10,666 Pa) respectively (the pressures of the supplying bent and the fifth bent were not especially reduced), thus concentrating the polymerization reaction liquid (o) by the devolatilization.

As to the resin as obtained after the devolatilization, the weight percentage ratio between the ethylene oxide resin (o) and the toluene (resin/toluene) was 99.24 weight %/0.76 weight %, and the water content was 127 ppm.

Various details of the invention may be changed without departing from its spirit not its scope. Furthermore, the foregoing description of the preferred embodiments according to the present invention is provided for the purpose of illustration only, and not for the purpose of limiting the invention as defined by the appended claims and their equivalents.

What is claimed is:

1. A production process for an ethylene oxide resin, which comprises the step of carrying out devolatilization of a solvent from a polymerization reaction liquid containing the solvent, thereby obtaining the ethylene oxide resin;
   wherein, prior to the devolatilization, the solvent in the polymerization reaction liquid is present in a range of 30 to 80% by weight;
   wherein, after the devolatilization, the ethylene oxide resin has a solvent concentration of 0.01 to 30 weight % and a water content of not more than 200 ppm, and
   wherein, after the devolatilization, the ethylene oxide resin contains no antistatic agent.

2. A production process according to claim 1, wherein the devolatilization is carried out in the temperature range of 40 to 300° C. under the pressure range of 13 to 100,000 Pa.

3. A production process according to claim 1, wherein the devolatilization is carried out using at least one apparatus selected from the group consisting of stirring-tank evaporators, falling-film evaporators, thin-film evaporators, surface-renewal-type polymerization vessels, extruders, and kneaders.

4. A production process according to claim 1, wherein the devolatilization is carried out in the temperature range of 40 to 300° C. under the pressure range of 13 to 100,000 Pa, and wherein the devoletilization is carried out using at least one apparatus selected from the group consisting of stirring-tank evaporators, falling-film evaporators, thin-film evaporators, surface-renewal-type polymerization vessels, extruders, and kneaders.

5. A production process according to claim 1, wherein a viscosity of the ethylene oxide resin after the devolatilization is in a range of 50 to 100,000 poise at 100° C.

6. A production process for an ethylene oxide resin in a devolatilization apparatus, which comprises the step of carrying out devolatilization of a solvent from a polymerization reaction liquid containing the solvent, thereby obtaining the ethylene oxide resin;
   wherein, prior to the devolatilization in said devolatilization apparatus, the polymerization reaction liquid is introduced into said devolatilization apparatus in a state where the solvent is present in a range of 30 to 80 % weight;
   wherein, after the devolatilization in said devolatilization apparatus, the ethylene oxide resin has a solvent concentration of 0.01 to 30 weight % and a water content of not more than 200 ppm, and
   wherein, after the devolatilization in said devolatilization apparatus, the ethylene oxide resin contains no antistatic agent.

7. A production process for an ethylene oxide resin in a devolatilization apparatus, which comprises the step of carrying out devolatilization of a solvent from a polymerization reaction liquid containing the solvent, thereby obtaining the ethylene oxide resin;
   wherein, prior to the devolatilization in said devolatilization apparatus, the polymerization reaction liquid is introduced into said devolatilization apparatus in a state where the solvent is present in a range of 30 to 80 % weight and where the ethylene oxide resin is present in a range of 20 to 70 weight %;
   wherein, after the devolatilization in said devolatilization apparatus, the ethylene oxide resin has a solvent concentration of 0.01 to 30 weight % and a water content of not more then 200 ppm,
   wherein, after the devolatilization in said devolatilization apparatus, a viscosity of the ethylene oxide resin is in a range of 50 to 100,000 poise at 100° C., and
   wherein, after the devolatilization in said devolatilization apparatus, the ethylene oxide resin contains no antistatic agent.

* * * * *